US008287011B2

(12) United States Patent
Cormier et al.

(10) Patent No.: US 8,287,011 B2
(45) Date of Patent: Oct. 16, 2012

(54) PEDESTRIAN-PROTECTIVE ENERGY ABSORBING SYSTEM (75) Inventors: Joel Matthew Cormier, Lathrup Village, MI (US); Donald Scott Smith, Commerce Township, MI (US); Richard Francois Audi, Dearborn, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 0 days.

(21) Appl. No.: 12/714,951

(22) Filed: Mar. 1, 2010

(65) Prior Publication Data

US 2011/0210570 A1 Sep. 1, 2011

(51) Int. Cl.
*B60R 19/03* (2006.01)
(52) U.S. Cl. .................................. 293/102; 296/187.09
(58) Field of Classification Search .................. 293/102, 293/120; 296/187.09
See application file for complete search history.

(56) References Cited

U.S. PATENT DOCUMENTS

| 3,852,150 | A | 12/1974 | Weller |
| 5,290,079 | A | 3/1994 | Syamal |
| 5,700,545 | A | 12/1997 | Audi et al. |
| 6,017,084 | A | 1/2000 | Carroll, III et al. |
| 6,199,942 | B1 | 3/2001 | Carroll, III et al. |
| 6,786,521 | B1 | 9/2004 | Jaffke et al. |
| 6,846,026 | B2 | 1/2005 | Detwiler et al. |
| 7,111,882 | B2 * | 9/2006 | Corscadden et al. ......... 293/120 |

OTHER PUBLICATIONS

International Search Report and Written Opinion; International application No. PCT/US2011/026471; date of mailing Apr. 28, 2011.

\* cited by examiner

*Primary Examiner* — Joseph Pape
(74) *Attorney, Agent, or Firm* — Brooks Kushman P.C.

(57) ABSTRACT

An energy absorbing structure 10 for protecting an impacted body, such as a pedestrian 12. The structure has an incident surface that meets the pedestrian and has at least some expanded metallic structure 18. A pair of wall support surfaces 20, 22 lie substantially in-plane with respect to a normal component of the impacting force. They extend from the incident surface in a direction opposite to the direction of the impact. The substantially in-plane surfaces also have at least some expanded metallic structure. A pair of basal surfaces 26, 28 support the in-plane surfaces, and also have at least some expanded metallic structure.

15 Claims, 8 Drawing Sheets

Hat
*Fig. 8a*

Drafted Hat
*Fig. 8b*

Conic Hat
*Fig. 8c*

Omega Hat
*Fig. 8d*

Dual Draft Hat
*Fig. 8e*

Convex Hat
*Fig. 8f*

Offset Hat
*Fig. 8g*

Drafted Hat Section
*Fig. 8h*

Offset Angle Hat Section
*Fig. 8i*

PEDESTRIAN-PROTECTIVE ENERGY ABSORBING SYSTEM

TECHNICAL FIELD

The invention relates to an energy absorbing structure for protecting pedestrians from forces associated with impact by an object, such as an automobile.

BACKGROUND

Interior occupant protection has been a key focus of worldwide safety agencies and legislation for many years. Many of the structures in and around the engine compartment and front end of the vehicle are designed to maximize occupant protection in high speed impacts. While these agencies have been historically focused on occupant protection, they were also aware that there was a high fatality rate associated with or as a result of pedestrians being struck by motor vehicles. Such agencies have identified the need to reduce the number of fatalities and serious injuries to pedestrians without compromising occupant protection at a reasonable cost to the OEMs and ultimately the consumer.

New legislation—both enacted and proposed—requires that the front end of motor vehicles in some markets be less rigid, so the severity of injuries sustained by pedestrians when struck by motor vehicles is reduced. This legislation sets forth the devices, test conditions, and performance criteria for protecting both the leg and the head of the pedestrian. Areas requiring this protection include the bumper system, grille, cowl, lenses, hood, fenders, wipers, pillars and any rigid structures behind these components which may pose a significant injury risk to a pedestrian in the event of an impact.

This legislation has had an effect on the design of energy absorbing systems—requiring new concessions and compromises in styling, mass, aerodynamics, offsets, gaps, stiffness, system packaging, and other safety requirements. Conforming systems must work in concert to meet or exceed key criteria and obtain the legislated safety performance. The challenge lies in developing solutions which are highly efficient, easy to tune, low cost, light weight, and occupy the smallest footprint and volume ("real estate").

Some pedestrian legislation requires a relatively compliant exterior surface ("skin") that crushes in such a way that the forces experienced by the leg or the head of the pedestrian are reduced. In areas where the structure of the current components and systems cannot be easily re-engineered to meet the criteria, packaging space must be created for energy absorbing countermeasures between the impacted object and the rigid structural member which poses an injury risk to the pedestrian (see, FIG. 1). This drives the need for high efficiency energy absorbers that can absorb the desired amount of energy in the shortest distance, with the lowest mass, and lowest system cost.

One challenge with integrating a pedestrian protection energy absorber into the vehicle systems is interposing the energy absorber between layers of metal which will subsequently be required to go through a high temperature painting operation. These temperatures can be in excess of 380 F. Few plastic resins which have been traditionally formed into energy absorbing structures are capable of withstanding these temperature extremes.

Polyurethane and expanded polypropylene foam have been used in energy absorbing applications in vehicles. While these materials are easily molded to the shape and contour of the energy absorbing volume, they are relatively inefficient, heavy and costly. They also have a tendency to split or cleave when impacted against a weld flange or narrow reaction surface. In addition, their dimensional stability though the paint cycle may also be suboptimal.

Injection molded energy absorbers, commonly referred to as rib cartridges or egg crates, have also been employed as energy absorbers throughout the vehicle. While these absorbers can be molded to fit the packaging space and have high levels of efficiency, they are also heavy, difficult to tune from a performance optimization standpoint, and would need to be formed from expensive engineered resins in order to survive the paint cycle.

Some energy absorbers use high efficiency thermoformed polymeric shapes which deform and crush to absorb the impact forces. These structures may be compatible and cost effective when attached to plastic trim systems such as headliners, door panels, and bumper fascia. However, these energy absorbers are difficult to attach to the metal body and other metal components without the use of secondary attachment features. These features would be impossible to incorporate on the back side of a metal fender or a hood. While they may be able to be interposed between two layers of material, the paint process that occurs after the two layers are fused to one another reaches a temperature at which the plastic will permanently deform and lose dimensional stability unless formed out of an expensive engineered resin. When attached post-painting, these absorbers have proven to be highly efficient and cost effective, but still possess some limitations. Because plastics tend to soften at high temperatures while becoming more rigid and brittle at lower temperatures, there are some variations in performance as temperatures change under typical vehicle operating conditions. In contrast, the performance of metal is relatively insensitive to such temperature fluctuations.

A pedestrian energy absorbing bumper system described in U.S. Pat. No. 6,846,026 is composed of a low carbon steel plate formed into a U-section which absorbs energy in a repeatable manner. While this absorber is relatively efficient and has the benefit of metal construction to survive the paint process, its mass is arguably heavier than an absorber which is not constructed from a solid "plate" of material. Other sheet metal structures have also been employed as energy absorbers but traditionally have a mass and cost penalty that often outweighs their performance benefits. An energy absorber partially composed of expanded metal is disclosed in commonly owned U.S. Pat. Nos. 5,700,545 and 6,017,084.

SUMMARY

A light weight, high efficiency, tunable, low cost energy absorber that retains its ability to absorb energy in varying ambient heat conditions, such as the heat of the paint process while at the same time being easy to attach to other components is desired.

In one embodiment, an energy absorbing countermeasure ("absorber") is disclosed for protecting a pedestrian that is hit by an impacting object, such as an automotive vehicle. The absorber has:

an incident surface that meets the pedestrian, the incident surface having at least some expanded metallic structure;

a pair of surfaces that lie substantially in-plane with respect to a normal component of the impacting force, the surfaces extending from the incident surface in a direction opposite to the direction of the impact, the substantially in-plane surfaces having at least some expanded metallic structure; and a pair of basal surfaces that support the substantially in-plane surfaces, the basal surfaces also having at least some expanded metallic structure.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1-7, in one form, an aspect of the invention includes an energy absorbing countermeasure ("absorber") 10 for protecting a pedestrian 12 that is hit by an impacting object, such as the fascia of a bumper or other rigid structural member 16 that is mounted on the front of a vehicle. The absorber 10 has an incident surface 24 that is oriented towards the pedestrian 12. The incident surface 24 may have at least some expanded metallic structure 18 and may be undulating or planar, dome-shaped, dish-shaped or combinations thereof ("curvilinear"). A pair of malleable wall supporting surfaces 20, 22 lie substantially in-plane with respect to a normal component of the impacting force (F). They extend from the incident surface 24 in a direction opposite to the direction of the impact. Like the incident surface 24 and basal surfaces 26, 28, the supporting wall surfaces 20, 22 are formed from faces that are selected from the group consisting of quadrilateral, generally sinusoidal, polygonal, hexagonal and combinations thereof. The substantially in-plane surfaces 20, 22 have at least some expanded metallic structure 18. A pair of basal surfaces 26, 28 support the substantially in-plane surfaces 20, 22. The basal surfaces 26, 28 may also have at least some expanded metallic structure 18.

A lattice of expanded metal 18 provides an opportunity to absorb energy directed in its plane, since the strands that form cells 18 (FIGS. 2A-2B) are capable of flexing in three dimensions (see, FIGS. 4-7). In one embodiment, a sheet of steel is expanded into linear arrays of elongated diamond-shaped cells 18. These cells (FIGS. 2A-B) have two axes, one (AM, the minor axis) is shorter than the other (EI, the major axis).

When the long axis is oriented relatively parallel to the impacting force (pedestrian or other object which is hit), cells of the expanded metal provide superior resistance when compared to the same expanded pattern if oriented 90 degrees in-plane away.

Orienting the diamond-shaped cells so that the long axes of the supporting walls are positioned relatively parallel to the impacting force (FIG. 2B) presents more strands of metal oriented substantially perpendicularly to a normal component of the impacting force (F). This allows more strands to be bent or compressed (FIG. 6) during an impact event and thus absorb the energy of impact. If N is the number of cells in a supporting wall, $0<N<1,000,000$. Similarly, for X number of cells in an incident surface and Y cells in each basal surface.

Another aspect of the disclosed energy absorber is the ability to tune performance. This can be accomplished by changing the expanded metal pattern (defined by the geometric shape of the expander tooling), the raw material thickness (which affects the dimensions of the strand—primarily perpendicular to the direction of impact) and the pitch between expansions (which controls the dimensions of the strands primarily parallel to the direction of impact).

Figure 7:
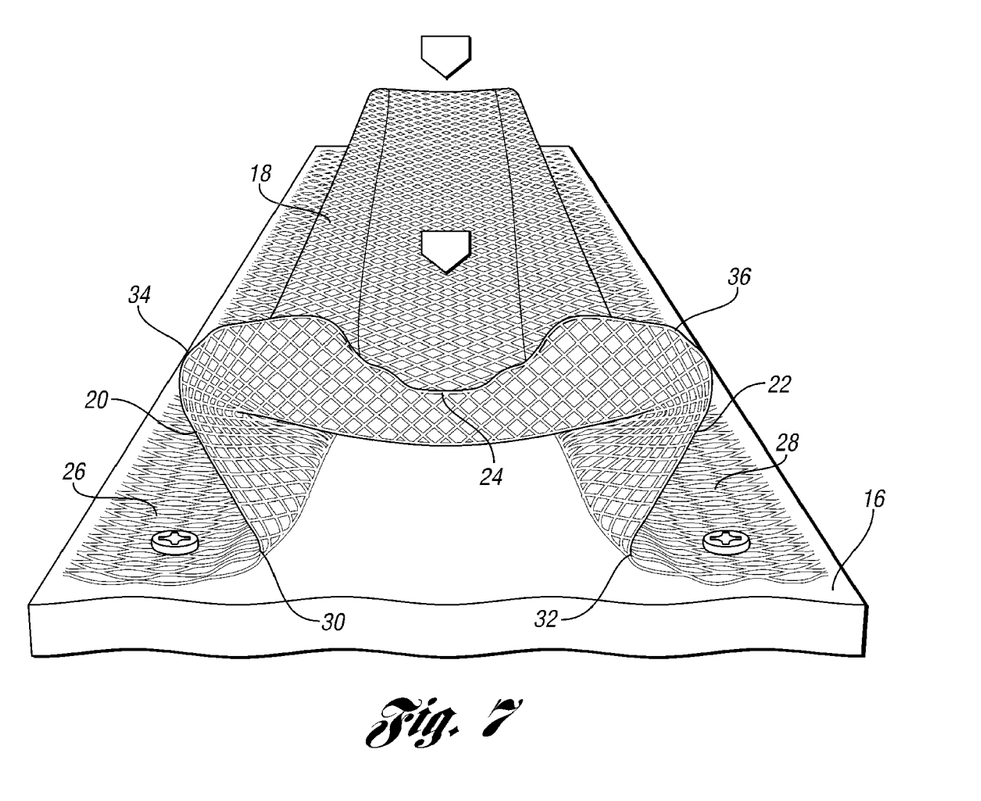
FIG. 7 is an end view of the specimen depicted in FIG. 3.
Figure 8A:
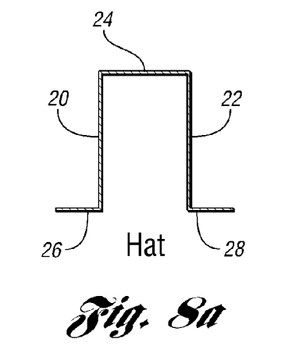
FIG. 8 depicts alternative sectional forms ("hat sections") of energy absorbers according to several aspects of the invention.
Figure 8B:
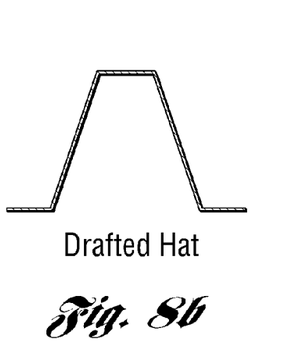
Figure 8C:
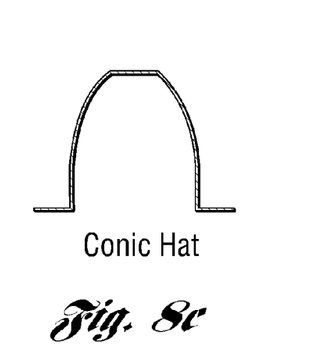
Figure 8D:
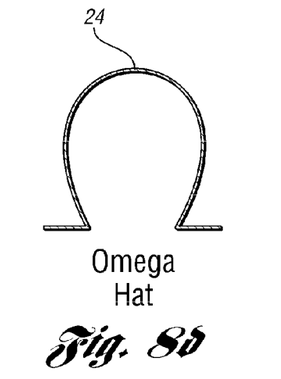
Figure 8E:
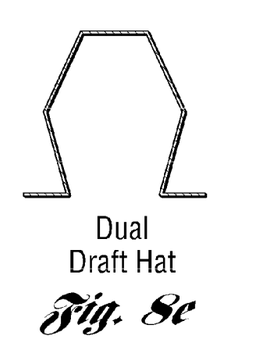
Figure 8F:
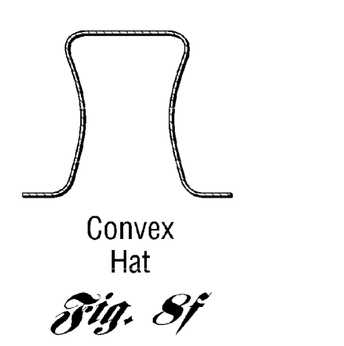
Figure 8G:
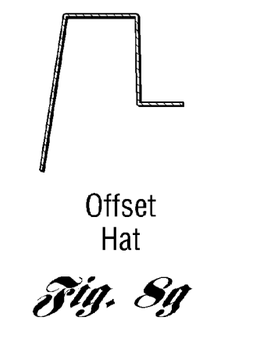
Figure 8H:
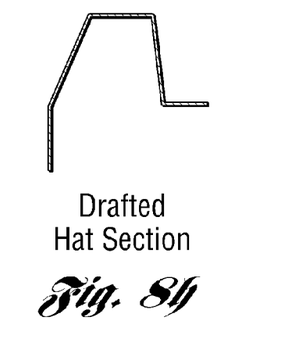
Figure 8I:
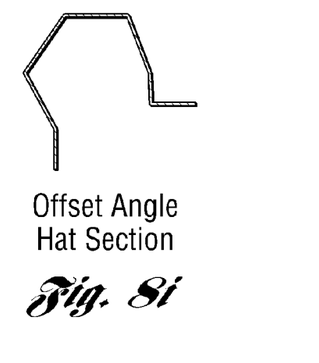

One embodiment tested (see, FIGS. 10-11) can be considered as a "hat" section. But it can be appreciated by those skilled in the art that the performance can further be tuned along the length of the absorber 10 by changing geometry (undulations, curvature of wall sections 20, 22 which may be concave, convex, ribbed, or linear—see, FIG. 8), selective removal of material (to weaken certain sections of the absorber as desired—see, FIG. 12), etc. One design factor recognizes that before impact there are two or more metal lattice walls that are substantially parallel that act in concert with (a) supporting base(s) 26, 28 and another reaction surface 24. The walls 20, 22 end to buckle and at least partially collapse to absorb the impact force (FIG. 7).

One way to prepare the expanded metal structure is to pierce a sheet of metal, which may be provided in roll form. The pierced metal is then stretched into a metal lattice, which may have various configurations. If desired, a flattening step may ensue. In some manufacturing processes, the stretching step work hardens the material and gives it improved stiffness compared to the unexpanded material. The flattening step may reduce the expanded metal to roughly its original unexpanded thickness. This further work hardens the steel and improves its flexural stiffness.

As one example of an expanded metallic structure 18, expanded low carbon steel has technical advantages compared to some energy absorbers described in the prior art. Representative materials include low carbon steels, 1008, 1010, Aluminum Kilned Draw Quality (AKDQ), galvanized steel, aluminum (5005 H 34), and the like. If desired, a protective coating can be applied to the expanded metal to provide corrosion resistance.

It will be apparent to those with skill in the art that the expanded cellular structure could be formed from etched, cast or other forming processes applied to materials, beside mechanically perforated methods. Other forms of "expanded metal" including other plates which are not entirely of a continuous form (for mass and performance optimization) may be deployed. For example, unit cells may be configured as round holes, or slotted holes (if an isotropic properties are desired) or hexagonal or other polygonal holes. As used herein, the term "expanded metal" is meant to encompass these and their equivalent structures.

The expanded metal of which the energy absorbing structure 10 is formed is available from sources such as the McNichols Company of Tampa, Fla. The material is available in numerous styles and can be constructed of various materials, depending upon the energy absorption characteristics of the structure.

If desired, the expanded metal 18 of the energy absorbing structure 10 of the present invention is prepared by selective cutting and shearing to produce an array of strands of metal. Local work hardening is engendered by this process, which may be decreased by annealing or other heat treatment.

As best depicted in FIGS. 3, 4, 7 & 9, the energy absorbing countermeasure 10 may be secured to the rigid structural member 16, or may not be secured to the rigid structural member 16. In the depicted examples, affixation is provided by screws 38, other means for affixing the absorber 10 to the rigid structural member may be provided. These include, but are not limited to weldments, rivets, staples, nuts and bolt, u-shaped nails, glue, tape, and the like.

Figure 2A:
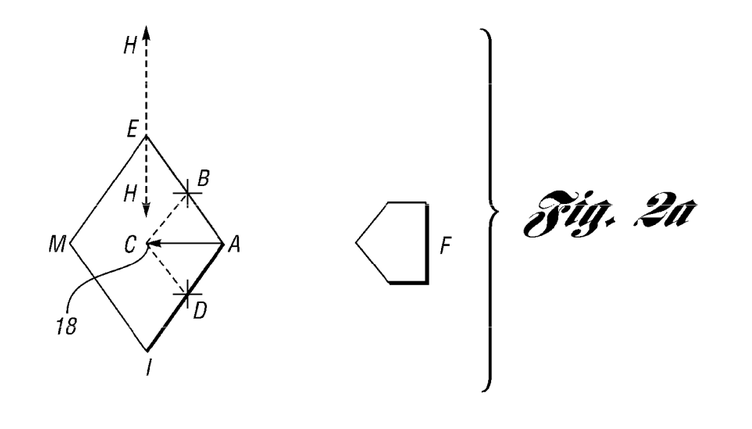
FIG. 2A illustrates a cell in an in-plane surface before impact in an expanded metal structure in which a major axis of the cell lies orthogonally to a normal component of impacting forces.
Figure 2B:
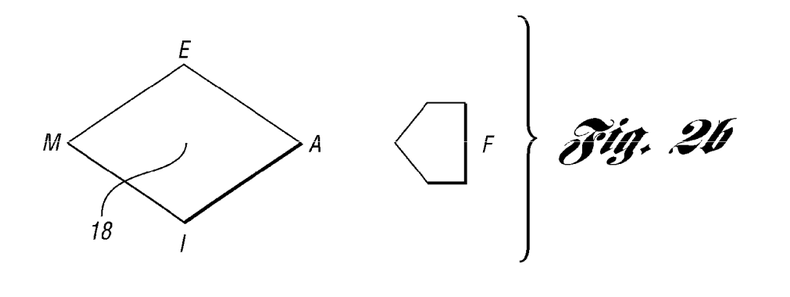
FIG. 2B illustrates a cell in an in-plane surface before impact in an expanded metal structure in which a minor axis of the cell lies orthogonally to a normal component of impacting forces.
Figure 3:
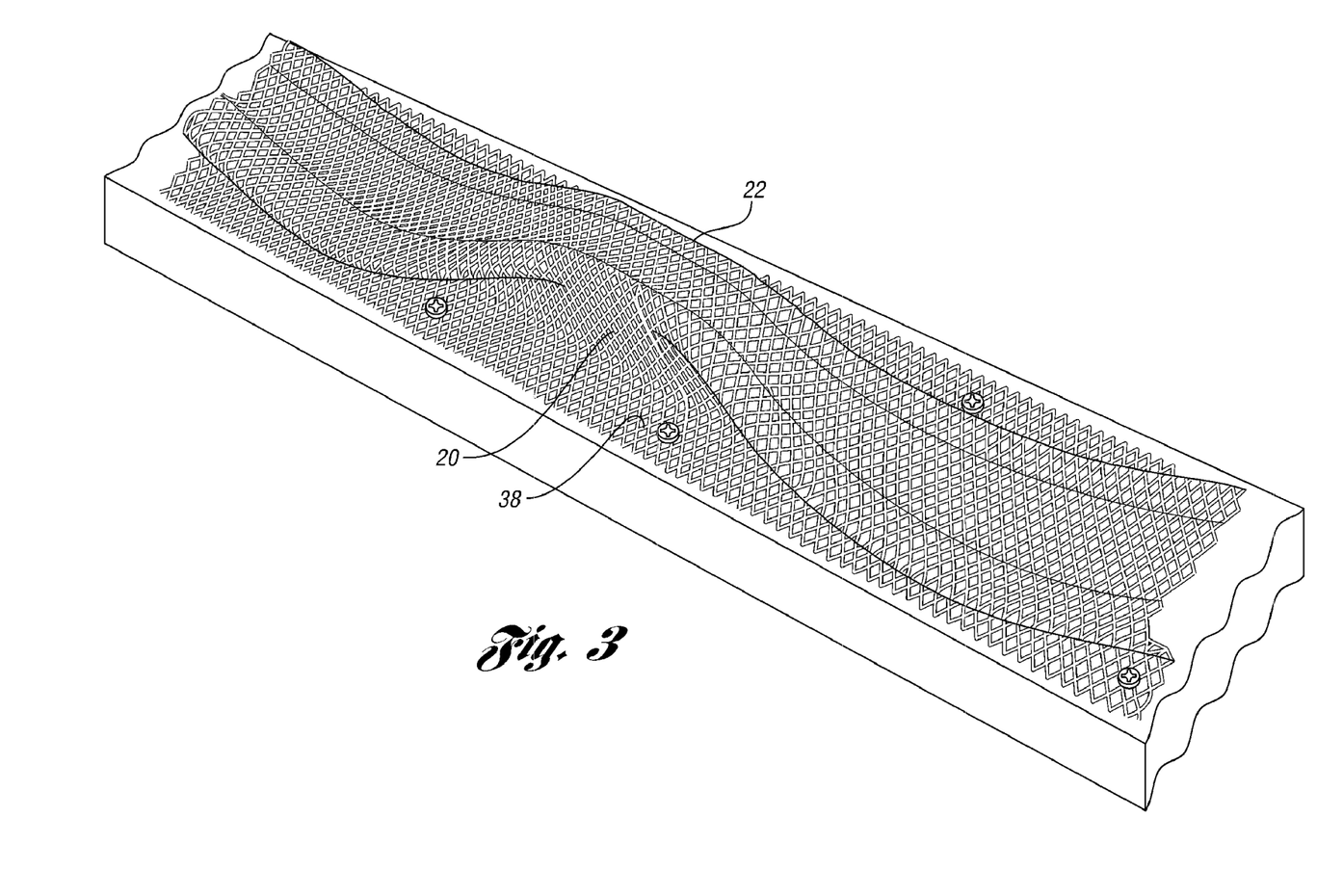
FIG. 3 is a quartering perspective view of a specimen of an expanded metal energy absorber post-impact.
Figure 4:
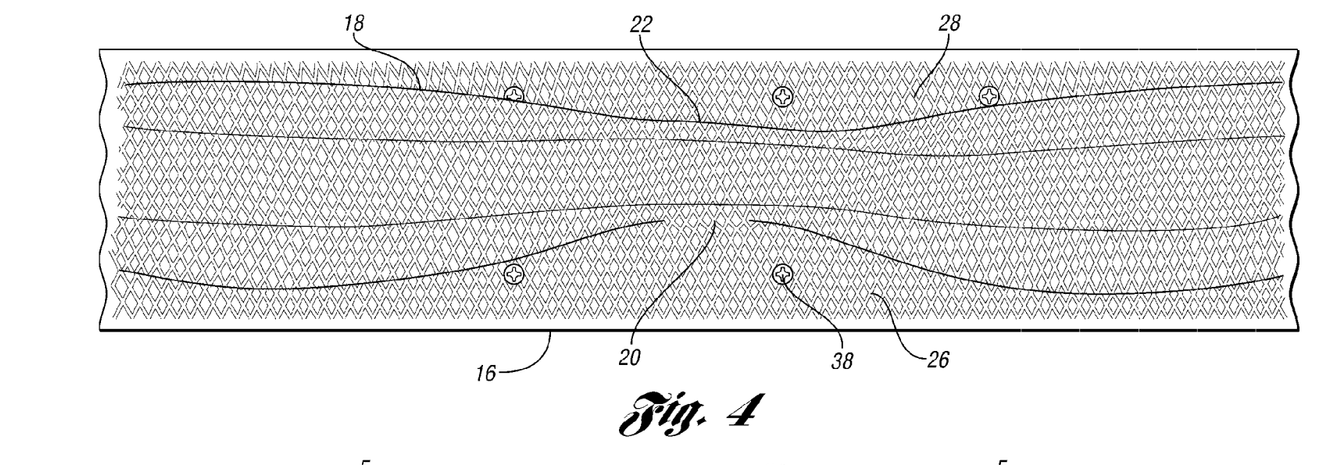
FIG. 4 is a top plan view of the specimen depicted in FIG. 3.
Figure 5:
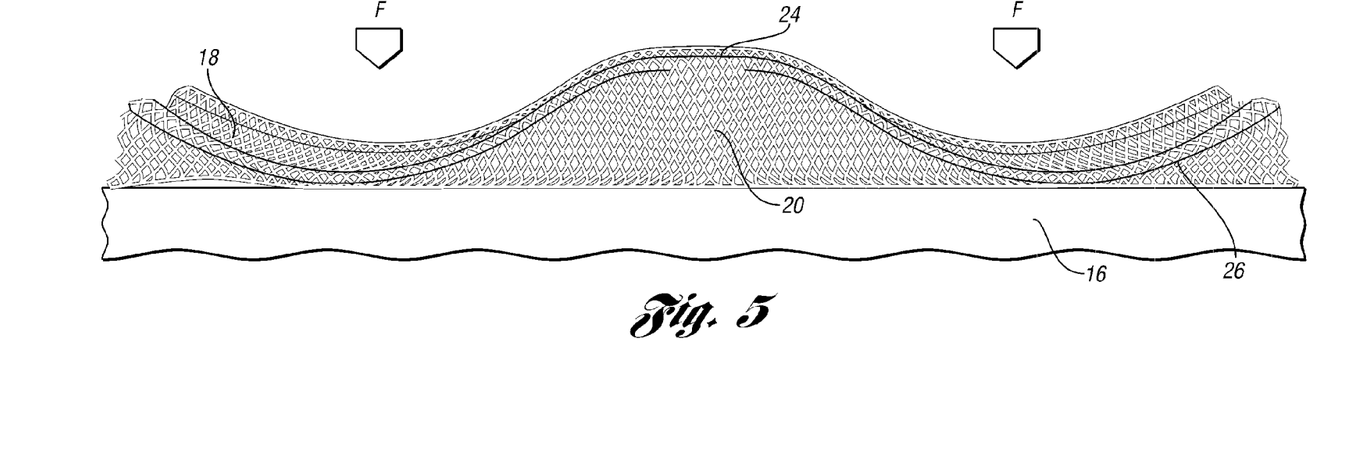
FIG. 5 is a side elevation view of the embodiment depicted in FIG. 3.

FIGS. 2A-B depict a diamond-shaped aperture or cell representative of those found in expanded metal. In some embodiments, apertures may be polygonal, having any number of sides. The sides may be curved or straight. In the diamond-shaped case (FIGS. 2A-B), four strands of metal are depicted.

Figure 1:
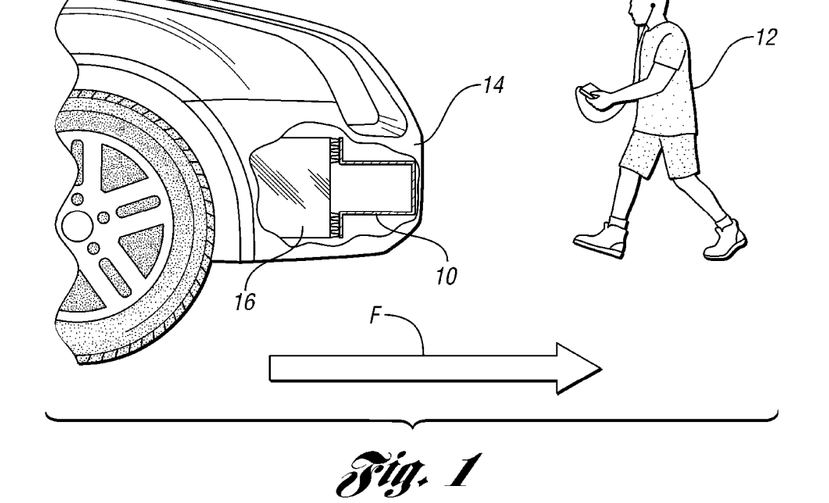
FIG. 1 illustrates schematically a representative environment in which an embodiment of an energy absorbing countermeasure ("absorber") serves to protect a pedestrian from the adverse consequences of impact.

Consider the force transfer relationships suggested by FIG. 1. Symbol "F" represents an impacting force that is inflicted upon, for example, a pedestrian 12. An equal and opposite reaction is exerted by the pedestrian upon the impacting object 14, such as the fascia of a bumper system. Those forces of reaction are transmitted to an energy absorbing countermeasure 10, by which they are at least partially absorbed before being communicated to a rigid structural member 16, such as a bumper beam.

Impact forces (F) are initially absorbed by the expanded metal of which support walls 20, 22 are formed. Such faces 20, 22 in the embodiment shown are disposed perpendicularly to the incident 24 and basal 26, 28 surfaces. With reference to primarily FIGS. 4-5, it will be appreciated that the plane of the walls 20, 22 before impact may lie substantially horizontally, vertically, or in a plane that lies therebetween. In some embodiments (e.g., FIG. 8), the support faces 20, 22 may be inclined or bowed in relation to each other. It will be appreciated that in some embodiments, the basal surfaces 26, 28 may be towed inwardly in relation to the hat, as opposed to outwardly (depicted). The three offset configurations at the bottom of FIG. 8 include conditions where the reaction surface of the rigid structural member 16 and one or more walls 20, 22 may be in alignment due to vehicle overlap for the "offset" to meet structural/performance and/or styling preferences.

As illustrated in FIGS. 3-7, the support faces 20, 22 may be secured by mounting surfaces 26, 28 to the rigid structural member 16 or impacting object 14 such as the hood of a car, or other A-surface thereof.

It will be appreciated that the supporting bases 26, 28 may assume various dimensions. For example, other things being equal, the narrower they are, the more energy absorbers may be aligned or juxtaposed within a given volume. Alternatively, or optionally, the mounting surfaces 26, 28 may assume a curved or sinusoidal appearance which may allow adjacent energy absorbers to be nestled against each other, thereby promoting the efficiency of packing volume.

It should be appreciated that the energy absorbing member 10 may be formed of faces 20, 22 which are other than quadrilateral. Other configurations may include a generally sinusoidal or polygonal configuration, or hexagonal configuration, and their equivalents.

As noted above, there may be more than one energy absorbing member 10—either alone, or sandwiched between the impacting object 14 and rigid structural member 16 (FIG. 1).

Returning now to FIGS. 1 & 2A-B, there is depicted an impacting object that transmits a force toward an apex A of a cell 18 in the array of expanded metal. Impact absorption is provided primarily by the bending or folding of sidewalls 20, 22 (FIG. 7). Folding or creasing of the walls 20, 22 occurs at the foot 30, 32 and shoulder portions 34, 36 of those walls 20, 22. At the foot portions 30, 32, the walls 20, 22 respectively are joined to the base mounting surfaces 26, 28. At the shoulder portions 34, 36, the sidewalls 20, 22 merge with the impacting surface 24.

Figure 6:
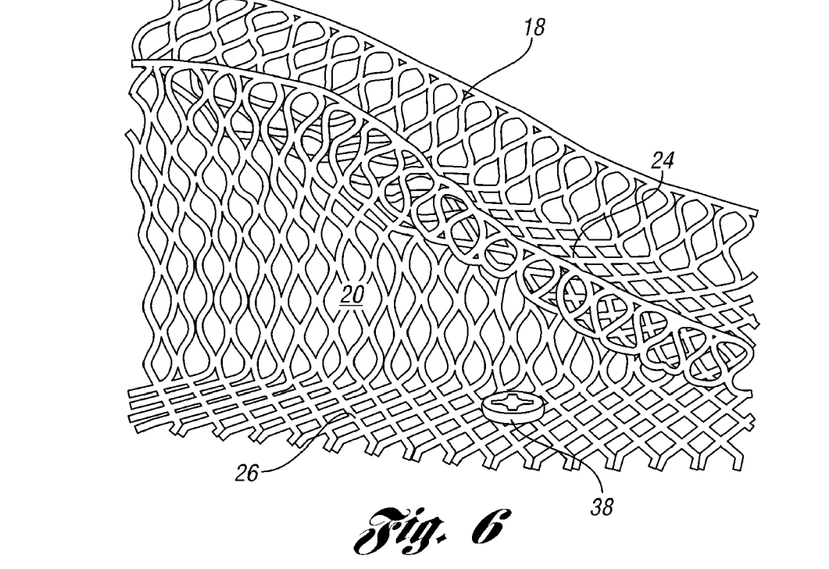
FIG. 6 is an enlarged view of a folded section of a portion of the energy absorber depicted in FIG. 5.

As depicted in FIG. 6, during and after impact, cells become progressively folded, such that after impact edge cells of the impacting surface 24 lie closer to and may touch cells oriented toward the shoulder edge of walls 20, 22. Similarly, for cells oriented toward the foot of the walls 20, 22 in relation to cells oriented toward the edge of the basal mounting surfaces 26, 28.

Impact forces are also absorbed by deformation and interplay between adjacent cells. A representative diamond-shaped aperture formed by four strands of the expanded metal is depicted in FIGS. 2A-B. The load is generally depicted by the vector AC which is resolved into component vectors AB and AD. The component AB is resisted by a force H' having a component EB. Thus, the action of force AB is met by the reaction of force EB. Support for EB is provided by the reaction of an adjacent cell.

The actual deformation mechanics on a microstructural or finite element analysis are more detailed and/or complex. It should be recognized that the disclosed invention encompasses all foreseeable strand conformations and deformation mechanics.

Similar constraints are imposed at opposing corners I and M. Thus, the lattice or array of cells cooperate to provide a progressive reaction to the impact forces generated by a collision of the object with the energy absorbing structure.

As compression proceeds, some apertures 18 become bent, (see, FIG. 6) and some support walls 20, 22 are flattened in an analogous manner to the bellows of an accordion or concertina upon being squeezed (see, FIG. 7). Ultimately, however, the array 18 is no longer able to absorb the impact forces. At that point, some apertures 18 collapse and the array is unable to provide further yield with which to absorb the impact forces. Nevertheless, during energy absorption, the forces absorbed has remained substantially constant during compression of the expanded metal (see, FIGS. 10-11) while the forces experienced by the pedestrian are reduced due to the countermeasure absorbing some of the kinetic energy of the event, thus reducing the severity of the impact and resulting forces on the pedestrian.

When the long axis AM (FIG. 2B) is oriented relatively parallel to the impacting force (pedestrian), cells of the expanded metal 18 provide superior resistance when compared to the same expanded pattern if oriented 90 degrees in-plane away (FIG. 2A).

Orienting the diamond-shaped cells so that their long axes AM are positioned relatively parallel to the impacting force (F) presents more strands of metal oriented substantially perpendicularly to a normal component of the impacting force (F). This allows more strands to be bent or compressed during an impact event and thus absorb the energy of impact.

Turning now to FIG. 8, alternative sectional, including certain offset views are depicted. Preferred embodiments include the conic, omega and dual draft hat sections, with the omega configuration perhaps being more preferred because more of its incident surface 24 is available to absorb energy than the other configurations depicted in FIG. 8.

Another aspect of the disclosed energy absorber is the ability to tune performance. This can be accomplished by changing the expanded metal pattern (defined by the geometric shape of the expander tooling), the raw material thickness (which affects the dimensions of the strand—preferably primarily perpendicular to the direction of impact) and the pitch between expansions (which influences the dimensions of the strands primarily parallel to the direction of impact).

Other sheet metal structures have also been employed as energy absorbers but traditionally have a mass and cost penalty that often outweighs their performance benefits.

The disclosed absorbers offer these, among other, characteristics:
1. Easy to tune with base material thickness
2. Easy to tune with expanded metal tooling pattern
3. Easy to tune with raw material pitch
4. LWD forming orientation allows one piece for full bumper length energy absorbers
5. Low cost
6. Weld compatibility with mating metal
7. Metal performance is insensitive to temperature
8. Metal is capable of surviving a paint cycle
9. Metal lattice allows for drainage
10. Metal lattice may serve dual functionality as a grille for filtration
11. High speed production potential through roll forming
12. High speed production potential through stamping.
13. Can be colored through powder coating
14. Porous for mastic attachment.

In FIG. 8, the alternative end views ("hat" sections) are depicted before impact. They include hat, drafted hat, conic hat (with convexedly outwardly shaped supporting wall surfaces), and omega-shaped, a dual draft hat, a convex hat, an offset hat, a drafted hat, and an offset angle hat. A selection can be made from them among other alternatives to assist in tuning the energy absorbing characteristic according to the desired energy absorbing criteria for a particular application.

While the embodiment tested can be characterized as a "hat" section, it can be appreciated by those skilled in the art that the performance can further be tuned along its length with both changes in geometry (undulations, curvature of wall sections which may be concave, convex, ribbed, or linear), selective removal of material (to weaken certain sections of the absorber as desired), etc. But alternative embodiments share in some form two or more metal lattice walls 20, 22 that are substantially parallel before impact that act in concert with one or more supporting base(s) 26, 28 and another reaction surface 24 and lattice cells at the shoulder 34, 36 and foot 30, 32 buckle and at least partially collapses to absorb some proportion of the impact force.

Figure 9A:
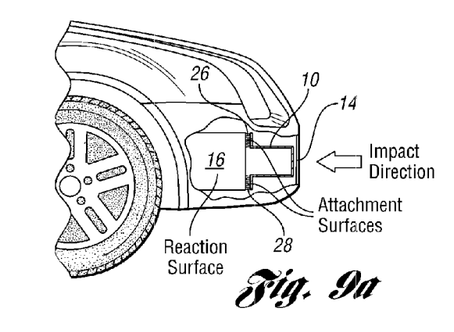
FIG. 9 depicts four alternative conditions which represent environments in which an energy absorbing countermeasure is placed, such as those depicted in FIG. 1.
Figure 9B:
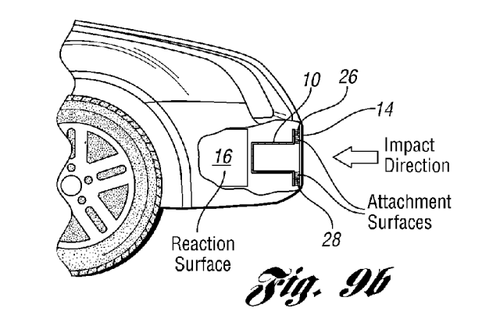
Figure 9C:
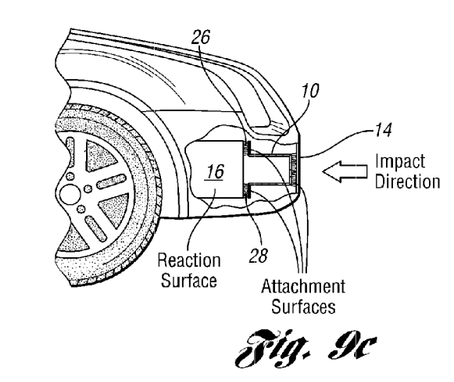

FIG. 9 illustrates four alternative conditions that are generically described in FIG. 1. In condition 1, an A-surface part (such as an automobile hood) plays the role of the impacting object 14 (FIG. 1). Attachment surfaces 26, 28 of the energy-absorbing countermeasure 10 are secured to a reaction surface of the rigid structural member 16 (FIG. 1). It will be appreciated that in conditions 3 & 4, the crown 24 of the hat section may also serve as an attachment surface, respectively to the A-surface part 14 and the rigid structural member 16 (reaction surface).

Condition 2 resembles condition 1, but inverts the "hat" section 10 and attaches its brim to the A-surface part 14.

Condition 3 resembles condition 1, but the attachment surfaces lie at the top and brim of the hat are found at the top and bottom of the hat.

In condition 4, the hat is reversed, but is still attached both to the impacting object 14 and the rigid structural member 16.

Figure 10:
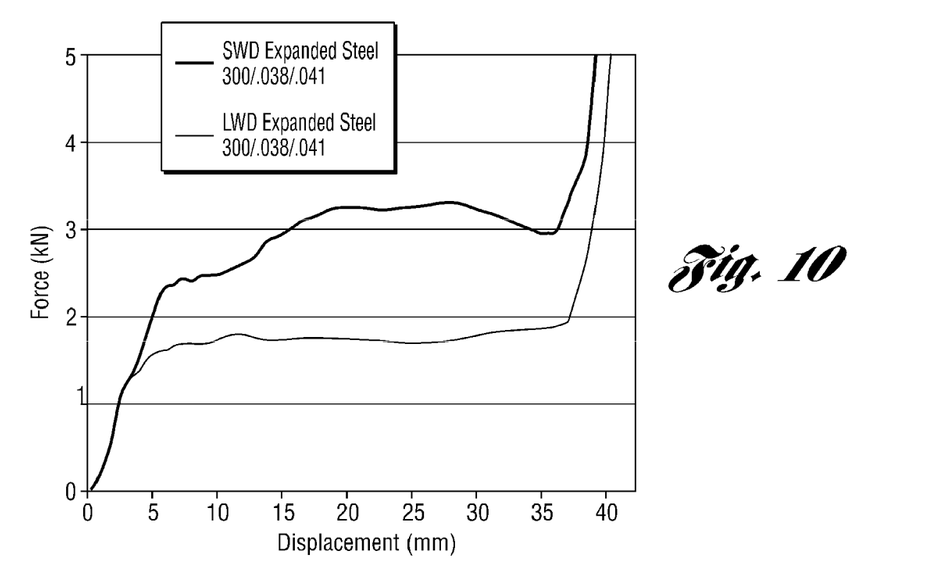
FIG. 10 is a graph that depicts the relative strength of some alternative "hat" sections of the expanded metal with different axis orientations: the LWD graph depicts one preferred embodiment due to its superior strength at an equivalent mass.

The graph of FIG. 10 depicts the relative strength of "hat" sections of expanded metal 18 with differing axis orientations. The LWD (long-major axis-parallel to the impact FIG. 2B) graph depicts a preferred embodiment due to its superior strength at an equivalent mass. During compression of the expanded mass, the force absorbed per unit of displacement of the energy absorbing structure rises upon impact. Thereafter, the force absorbed remains substantially constant while the kinetic energy of the object is dissipated. Thus, the displacement-load curve assumes a near square wave characteristic.

In FIG. 10, there is depicted for illustration the load-displacement characteristics of specimens of expanded steel. Upon inspection, it can be observed that the force absorbed per unit of displacement remains substantially constant over a displacement of about 10-35 mm during compression of the expanded metal. Thus, one advantage of the invention is that it has high crush efficiency. Foam absorbers tend to ramp up slowly and then "stack up" at 65-85% of the stroke available between the impacting object 14 and the rigid structures member 16. The absorber 10 from which the curves in FIGS. 10 and 11 were generated ramps up quickly. The absorbers were all approximately 37 mm tall prior to a relatively normal impact with a hemispherical indenter (impacting object 14).

Considering that the absorber does not appear to "stack up" until roughly 35 mm of stroke is achieved, the absorbers depicted are calculated to have efficiencies in excess of 90%. This is desirable when exterior styling, performance and packaging interactions are considered.

Figure 11:
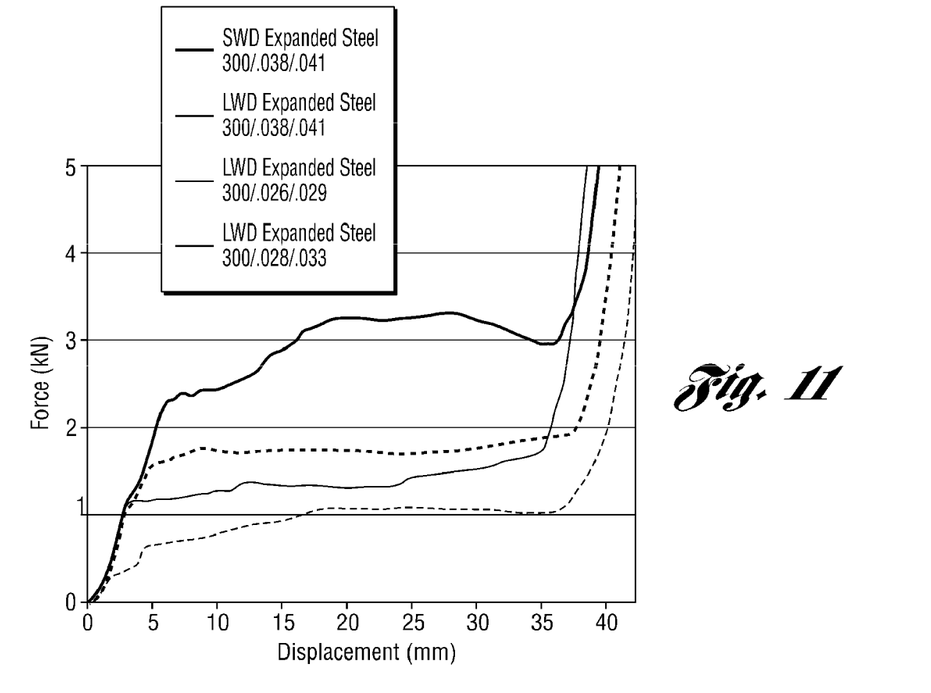
FIG. 11 is a graph that depicts "hat sections" of a 300 pattern of expanded metal with different strand dimensions to demonstrate performance tuning capability by changing dimensions, strand orientation, or both.
Figure 12:
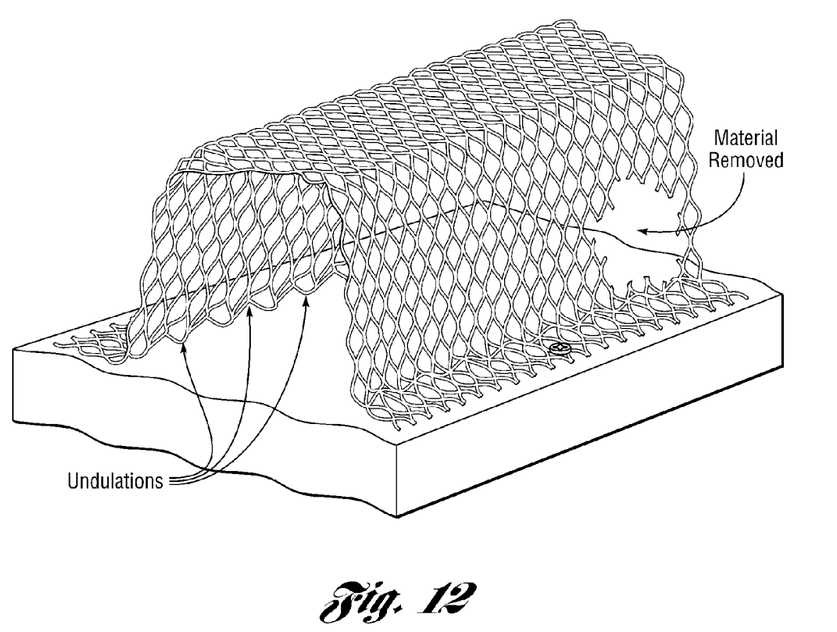
FIG. 12 depicts an alternate embodiment of an absorber from which material has been removed and undulations appear in the region where a support wall meets a base or attachment surface.

The graph of FIG. 11 shows a hat section of a "300 pattern" of expanded metal with different strand dimensions to demonstrate energy-absorbing performance tuning capability by changing both dimensions and strand orientation.

In FIGS. 10-11, the "300 pattern" quantities, in the examples shown, the distance from a point in a cell to the corresponding point in an adjacent cell that is aligned with the first cell, expressed in thousandths of an inch. In the examples depicted, the second number (e.g., 0.038) quantifies the thickness of the expanded metal section. Units such as 0.041, 0.029 and 0.033 quantify in thousandths of an inch the thickness of a leg in a cell (strand width).

While exemplary embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An energy absorbing structure for protecting an impacted object, such as a pedestrian or other body or object that impacts or is impacted by the structure, the structure comprising:
    an incident surface that is oriented towards the impacted object, the incident surface having at least some expanded metallic structure formed from a sheet or coil with slits made by cutting or shearing, the sheet or coil being stretched to form cells having interlinked stranded edges that do not unravel in normal use, the incident surface being curvilinear before impact;
    a pair of bowed supporting wall surfaces that lie substantially in-plane with respect to a normal component of the impacting force extending from the incident surface in a direction opposite from the impacted object, the bowed supporting wall surfaces having at least some expanded metallic structure, wherein the expanded metallic structure in the pair of bowed supporting wall surfaces includes cells, at least some of the cells having a major axis that lies substantially parallel to a major component for forces associated with impact; and
    a pair of basal surfaces that support the bowed supporting wall surfaces, the basal surfaces also having at least some expanded metallic structure,
    wherein the incident surface, the pair of bowed supporting wall surfaces, and the pair of basal surfaces define a hat section, the hat section being configured in a shape defined by a group consisting of a conic hat, an omega-shaped hat, a dual draft hat, a convex hat, an offset hat, a drafted hat, an offset angle hat, and combinations thereof.

2. The energy absorbing structure of claim 1, further comprising:
    a rigid structural member interposed between the impacted object and the incident surface of the structure.

3. The energy absorbing structure of claim 1, further comprising a rigid structural member from which the impacted object is to be protected, the member being selected from a group consisting of a bumper beam, a fender, a brace, a mount, a strut, and other rigidly mounted structures.

4. The energy absorbing structure of claim 1, wherein the expanded metallic structure include cells that are shaped from a group consisting of a diamond shape, a quadrilateral shape, a polygonal shape, a circular shape, an oval shape, an oblong shape, and a slot.

5. An energy absorbing system for protecting an impacted object, such as a pedestrian or other body or other object that impacts the system, the system comprising:
    a rigid structural member that meets the impacted object; and
    an energy absorbing countermeasure with an incident surface that is located on a side of the rigid structural member that lies opposite the impacted object, a pair of bowed supporting wall surfaces having an expanded metallic structure and a pair of basal surfaces, the supporting wall surfaces having at least some expanded metallic structure formed from a sheet or coil with slits made by shearing, the sheet or coil being stretched to form cells having interlinked stranded edges that do not unravel in normal use, the supporting wall surfaces being curvilinear before impact;
    wherein the incident surface, the pair of bowed supporting wall surfaces, and the pair of basal surfaces define a hat section, the hat section being configured from a shape defined by a group consisting of a conic hat, an omega-shaped hat, a dual draft hat, a convex hat, an offset hat, a drafted hat, an offset angle hat, and combinations thereof.

6. The energy absorbing system of claim 5, wherein the rigid structural member comprises an A-surface of an automobile.

7. The energy absorbing system of claim 5, wherein the energy absorbing countermeasure is secured to the rigid structural member.

8. The energy absorbing system of claim 5, wherein the energy absorbing countermeasure is secured to the impacting object.

9. The energy absorbing system of claim 5, wherein the energy absorbing countermeasure is secured to the impacting object and the rigid structural member.

10. The energy absorbing system of claim 5, wherein the incident surface is attached to the impacting object and the pair of basal surfaces is attached to the rigid structural member.

11. The energy absorbing system of claim 5, wherein the pair of basal surfaces is attached to the impacting object and the incident surface is attached to the rigid structural member.

12. The energy absorbing structure of claim 1, wherein the pair of supporting wall surfaces have a shape that is selected from the group consisting of quadrilateral, generally sinusoidal, polygonal, hexagonal and combinations thereof.

13. The energy absorbing system of claim 5, wherein multiple energy absorbing structures are interposed between the impacting object and the rigid structural member.

14. The energy absorbing structure of claim 1, wherein the expanded metallic structure includes at least some cells which during and after impact become progressively folded, such that after impact, edge cells of an impacting surface lie closer to and may touch cells oriented toward a shoulder edge of the supporting wall surfaces and cells oriented toward a foot of the supporting wall surfaces become closer to and may touch cells oriented toward an edge of the basal surfaces.

15. The energy absorbing structure of claim 1, wherein the expanded metallic structure includes cells which become bent following impact and the pair of supporting wall surfaces become flattened.

* * * * *